Sept. 13, 1938.   W. TIDDY ET AL   2,130,163
PROCESS OF MAKING GAS
Filed Jan. 24, 1936
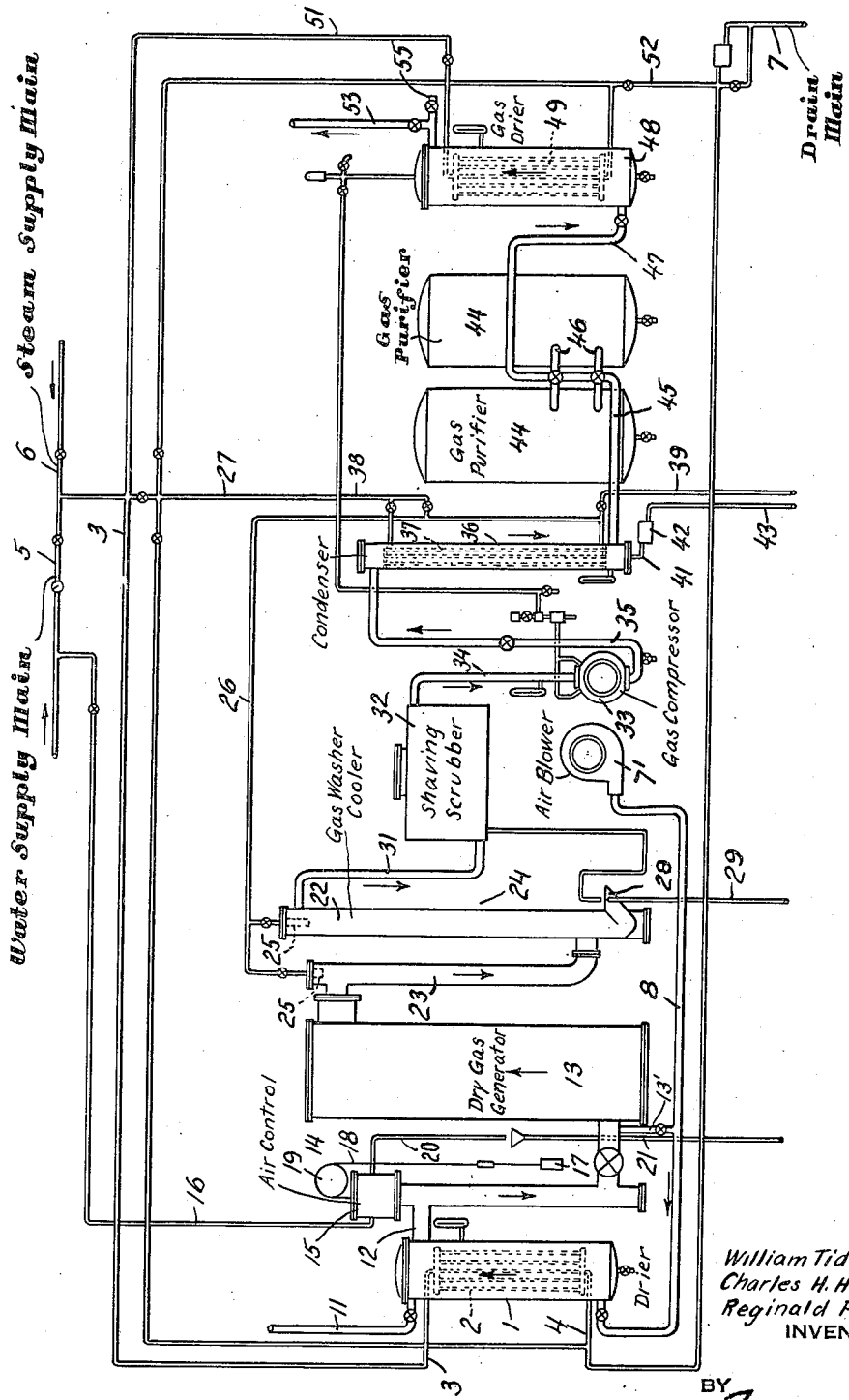
William Tiddy
Charles H. Hughes
Reginald P. Oliveros
INVENTORS
BY
ATTORNEY Patented Sept. 13, 1938

2,130,163

UNITED STATES PATENT OFFICE 2,130,163

PROCESS OF MAKING GAS

William Tiddy, New York, N. Y., Charles H. Hughes, Glen Ridge, N. J., and Reginald P. Oliveros, Brooklyn, N. Y., assignors to Semet-Solvay Engineering Corporation, New York, N. Y., a corporation of New York Application January 24, 1936, Serial No. 60,572

5 Claims. (Cl. 23—5)

This invention relates to the production of gas, and more particularly, to the production of a gas consisting substantially entirely of carbon monoxide and nitrogen.

A gas free of oxygen, preferably also substantially free of hydrogen, moisture and sulfur impurities, has a number of industrial applications, such for example, the refining of metals, oil refining, etc. A process for making such gas for such industrial uses must be flexible and economical to operate. For some of such industrial uses it is important the gas be made continuously as desired, so that it will be available as made for the intended use without involving the expense of costly storage equipment for large volumes of the gas.

Producer gas, as is well known, may be made by continuously passing a mixture of air to which steam may be added through a bed of fuel such as coal or coke. So-called "dry gas producers" in which no steam is added to the air but air alone passed through the fuel bed are also well known. Producer gas processes involving passage of air alone through the fuel bed, while flexible, continuous and economical, result in the production of a gas containing small amounts of oxygen (which may be as low as .5%), and substantial amounts of carbon dioxide. In the case of producer gas operations involving the addition of steam to the air, substantial amounts of hydrogen are produced. The presence of oxygen in amounts as low as .2% and the presence of substantial amounts of hydrogen render such producer gas unsuitable for the industrial purposes hereinabove mentioned.

It is an object of the present invention to provide a process of making a gas consisting substantially entirely of carbon monoxide and nitrogen and substantially free of oxygen and hydrogen, which process can be economically practiced to continuously supply the desired volume of gas for the intended use. Other objects and advantages of this invention will be apparent from the following detailed description.

In accordance with this invention air is first subjected to a drying treatment to remove moisture therefrom. For example, a stream of air may be blown continuously over activated alumina or silica gel in one of two chambers, permitting regeneration of the spent alumina without interrupting the removal of moisture from the air stream. The dried air is then passed through a bed of coke or charcoal maintained in a dry bottom chamber similar to the well-known dry bottom producers. We have found it is important to maintain the bed of coke or charcoal at a depth bearing a predetermined relation to the diameter of the fuel bed in the case where the fuel bed is disposed in a cylindrical generator, as is preferred. In the case where a gas generator not circular in cross section is employed, the depth of the fuel bed should bear a pre-determined relation to the cross sectional extent thereof, by which is meant the diameter of a circle having an area equal to the area of a horizontal cross section through such non-circular fuel bed. In accordance with this invention, the depth of the fuel bed is maintained equal to at least three and preferably four times the diameter or cross-sectional extent of the bed. By so doing we have been able to produce a gas free of oxygen and containing the desired properties for the aforementioned industrial uses.

From the fuel bed the gas is scrubbed with water to remove water solubles and condensables such as tar. The scrubbed gas may then be passed through a scrubber containing wood shavings which effects the removal of entrained dust and fuel particles. From the scrubber the gas is passed through an indirect cooler which effects the condensation of water vapor. The dried gas is then passed through a purifier such as the well-known iron oxide purifier for the removal of sulfur. From the purifier the gas is passed through a drier containing activated alumina or other moisture absorbing material such as silica gel to remove residual traces of moisture. The dry gas may then be passed directly to the desired point of use, as for example, it may be forced over or through a body of molten metal to reduce impurities, particularly oxides, therein.

In one example of operation on a commercial scale in accordance with the process of this invention, a gas having the following analysis was produced:

| | | |
|---|---|---|
| CO | per cent by volume | 31.3 |
| $N_2$ | do | 66.6 |
| $CO_2$ | do | 2.1 |
| $O_2$ | do | 0.0 |
| $H_2O$ | pounds per cu. ft | .00005 |
| Sulfur | do | .000015 |

It will be noted that this gas contained no oxygen, that the amounts of moisture and sulfur present were negligible and that the gas consisted substantially entirely of carbon monoxide and nitrogen, containing only 2.1% of carbon dioxide.

The single figure of the accompanying drawing forming part of this specification shows for purposes of exemplification a preferred arrangement of apparatus for practicing the process of this invention.

In the drawing reference character 1 indicates a drier constituted of a closed cylindrical steel tank placed in a vertical position and having therein a nest of coils 2. These coils are used for either drying or regenerating the spent activated alumina or silica gel or other material employed for the removal of moisture from the air passed through the drier or for cooling the moisture absorbing material to the desired temperature after it has been regenerated. For this purpose coils 2 communicate by means of a pipe line system 3, 4 with a water supply main 5, a steam supply main 6 and a drain main 7 provided with suitable valves controlling the flow of steam or water through the coils, return of steam to the steam source and discharge of water from the coils into the drain main. As any suitable piping arrangement may be employed, it is considered unnecessary to describe it in further detail.

Preferably two driers are employed and are interconnected by suitable pipe lines so that air from blower 7' may be passed through main 8 to either drier containing the vapor absorbing material; one drier operating to remove vapor from the air while the vapor absorptive material in the other drier is being regenerated or is idle. As will be understood, by the use of two driers in this manner it will not be necessary to interrupt the operation when the vapor absorptive material in one of the driers is spent, but the air may then be blown through the other drier and the first mentioned drier regenerated. Each drier is provided with a valve controlled pipe 11 through which the moisture absorbed leaves the drier as steam during the regeneration step involving the vaporization of the moisture by steam passed through coil 2.

The driers communicate by means of a pipe 12 with a dry gas generator 13. An air control 14 of any well known type may be employed to insure that the air at a substantially uniform pressure is supplied to the gas generator. In the embodiment of the invention shown on the drawing a float type air control is depicted involving a container 15 supplied with water by pipe line 16 communicating with main 5. By adjusting the weight 17 directly connected with the float through chain 18 passing over pulley 19, the control may be set for the desired pressure of air fed to the dry gas generator 13. The container 15 is provided with an overflow 20 communicating with a drain 21. It will be understood in lieu of a float type control any other desired type control may be employed. The generator 13 may also be connected directly to air main 8 by valved by-pass 13'.

The gas generator 13 may be of any conventional type having a dry bottom, i. e., not liquid sealed. In this gas generator a bed of coke or charcoal is maintained on a grate to a height which is at least equal to three and preferably four times the diameter of the generator. I have found that by maintaining the fuel bed at such height the oxygen content of the dry air passing therethrough will be substantially completely reacted.

A washer cooler 22 communicates with the gas offtake of the generator 13. The washer cooler shown on the drawing is provided with two cylindrical portions 23, 24 each provided with a water spray 25 at the top thereof. The water sprays communicate with the pipe line 26 which in turn is connected to pipe 27 communicating with the water main 5. As the gas passes from the generator 13 through the branches 23, 24 of the washer cooler it is intimately contacted with water so as to cause water solubles and condensables such as tar constituents to be removed therefrom. The tar and water solubles settle in the basin 28 of the washer cooler and overflow through drain 29.

A main 31 connects the top of the branch 24 of the washer cooler with the shaving scrubber 32. This shaving scrubber may be a rectangular box filled with wood shavings through which the gas is caused to pass. In so doing, entrained particles of ash dust and fuel are removed from the gas before it enters the compressor 33 through the connecting line 34. Compressed gas flows through line 35 into an indirect cooler or condenser 36. This condenser may be of any standard type provided with a bank of cooling coils 37 communicating with a valve controlled pipe 38 which is connected with the water supply 5 and a valve controlled discharge pipe 39 through which water passed through the bank of coils is discharged. Condenser 36 is provided with a draw-off pipe 31 for the discharge of moisture and oil condensed therein. Pipe 41 leads into a trap 42 provided with a drain pipe 43 through which water may be discharged.

Gas purifiers 44 communicate with the condenser 36 by a pipe 45. In the drawing two gas purifiers are shown and these are interconnected by valve controlled pipes 46 in such manner that gas may flow through both purifiers in series or through either purifier and thence into the pipe line 47. Thus either purifier 44 may be cut out of the system and the iron oxide therein regenerated while the other purifier is employed to remove sulfur impurities from the gas. From the iron oxide purifiers 44 the gas passes through valve controlled pipe 47 into a drier 48 which may be the same type as drier 1 hereinabove described. As shown in the drawing drier 48 is provided with a coil 49 through which steam or water may be circulated. Coil 49 communicates through pipes 51, 52 with the water and steam flow system hereinabove described. A valve controlled discharge pipe 53 communicates with the top of the drier 48 through which moisture absorbed by the activated alumina or other vapor absorptive material therein, may be discharged as steam during the regeneration step.

The apparatus herein described is equipped with usual instruments such as thermometers, steam, gas and water gauges and safety valves which are indicated on the drawing and require no description.

In operation, to start the generator, air may be admitted from air main 8 through valved by-pass 13' into the generator; use of undried air to initially heat the fuel bed eliminates the cost of drying the air for this operation. When the fuel bed in the generator has reached the desired temperature, the valve in the by-pass is closed and air from blower 7 is forced upwardly through the activated alumina in one of the two driers 1. The dried air enters the bottom of the gas generator 13 and passes upwardly through a deep bed of coke or charcoal which, as above indicated, should be maintained at a depth at least equal to three times the diameter of the bed of coke or charcoal. The hot gas leaves the top of the producer and enters the washer cooler 22 where it is scrubbed and cooled by direct contact with cooling water. From the top of the washer cooler 22 the gas passes through shaving scrubber 32, where entrained particles such as ash dust and fuel are removed and enters the compressor 33. The gas may be compressed to the desired pressure for the intended use, for example, in the case of refining metal to a pressure of about 15 pounds per square inch. From the compressor the gas passes through the cooler or condenser 37 where the temperature of the gas increased by compression is reduced and some condensables removed from the gas. The gas leaves the bottom of the condenser 36 and enters the iron oxide purifiers 44 which effects the removal of sulfur impurities in the well known manner. The gas then passes through actived alumina or other vapor absorptive material in the drier 48 where residual traces of moisture are removed, producing the finished gas, consisting substantially entirely of carbon monoxide and nitrogen, which may leave through valve controlled pipe line 55 to a suitable point of use. The gas leaving the generator during the starting operation, i. e. while air is being admitted through by-pass 13', is preferably not mixed with the producer gas resulting from the introduction of dried air into the generator.

It is to be understood that this invention is not restricted to the present disclosure otherwise than as defined by the appended claims.

We claim:

1. The process of making a gas consisting substantially entirely of carbon monoxide and nitrogen which comprises removing substantially all of the moisture from air, passing the moisture free air through a bed of hot fuel from the group consisting of coke and charcoal while maintaining the said bed of fuel at a sufficient depth to react substantially all of the oxygen content of the moisture free air with the fuel and removing impurities from and drying the resultant gas.

2. The process of making a gas consisting substantially entirely of carbon monoxide and nitrogen which comprises drying air to remove substantially completely the moisture content therefrom, passing the dried air through a bed of fuel selected from the group consisting of charcoal and coke, while maintaining the depth of the fuel bed at a height equal to at least three times the cross-sectional extent of the fuel bed and purifying and drying the resultant gas.

3. The process of making a gas consisting substantially entirely of carbon monoxide and nitrogen and substantially free of oxygen, hydrogen, moisture and sulfur impurities which comprises continually passing a stream of air over moisture-absorbing material to remove the moisture substantially completely therefrom, passing the moisture free air through a bed of coke of a sufficient depth to react substantially all of the oxygen content of the air with the fuel, removing water solubles, condensable constituents and entrained solid impurities from the resultant gas, cooling the thus partially purified gas to condense moisture, removing sulfur impurities from the partially purified gas and removing residual moisture from the resultant gas.

4. The process of making a gas consisting substantially entirely of carbon monoxide and nitrogen and substantially free of oxygen, hydrogen, moisture and sulfur impurities which comprises continuously passing air over material having a strong affinity for the moisture to obtain substantially moisture free air, passing the moisture free air through a bed of fuel selected from the group consisting of coke and charcoal of a depth equal to at least three times its cross sectional extent to react substantially all of the oxygen content of the air with the fuel, continuously passing the gas from the fuel bed through a water scrubber to remove water solubles and condensable constituents, continuously passing the water scrubbed gas through a scrubber filled with wood shavings to remove entrained ash dust and fuel particles, compressing the scrubbed gas, continuously cooling the compressed gas to condense water vapor, passing the water free gas through a bed of iron oxide to remove sulfur impurities and removing residual moisture in the gas.

5. The process of making a gas consisting substantially entirely of carbon monoxide and nitrogen and substantially free of oxygen, hydrogen, moisture and sulfur impurities which comprises continuously substantially completely removing moisture from a stream of air by passing it through a body of activated alumina, passing the moisture free air stream through a bed of fuel selected from the group consisting of coke and charcoal while maintaining the said fuel bed at a depth equal to about four times the cross-sectional extent of the fuel bed, continuously passing the gas from the fuel bed through a water scrubber to remove water solubles and condensable constituents, continuously passing the water scrubbed gas through a scrubber filled with wood shavings to remove entrained ash dust and fuel particles, compressing the scrubbed gas, continuously cooling the compressed gas to condense water vapor, passing the water free gas through a bed of iron oxide to remove sulfur impurities and drying the gas by passing it through a body of activated alumina.

WILLIAM TIDDY.
CHARLES H. HUGHES.
REGINALD P. OLIVEROS.